United States Patent

Branly et al.

(10) Patent No.: US 10,563,466 B2
(45) Date of Patent: Feb. 18, 2020

(54) MULTIPURPOSE DOUBLE ABUTMENT SEALED CONNECTION

(71) Applicant: TUBOSCOPE VETCO (FRANCE) SAS, Berlaimont (FR)

(72) Inventors: Romain Branly, Lille (FR); Fabien Carrois, Valenciennes (FR)

(73) Assignee: Tuboscope Vetco (France) SAS, Berlaimont (FR)

( * ) Notice: Subject to any disclaimer, the term of this patent is extended or adjusted under 35 U.S.C. 154(b) by 73 days.

(21) Appl. No.: 15/515,709

(22) PCT Filed: Oct. 14, 2015

(86) PCT No.: PCT/EP2015/073762
§ 371 (c)(1),
(2) Date: Mar. 30, 2017

(87) PCT Pub. No.: WO2016/059103
PCT Pub. Date: Apr. 21, 2016

(65) Prior Publication Data
US 2017/0298698 A1  Oct. 19, 2017

(30) Foreign Application Priority Data
Oct. 16, 2014 (FR) .................................. 14 59934

(51) Int. Cl.
*F16L 15/06* (2006.01)
*E21B 17/042* (2006.01)

(52) U.S. Cl.
CPC ............ *E21B 17/042* (2013.01); *F16L 15/06* (2013.01)

(58) Field of Classification Search
CPC ......... F16L 15/001; F16L 15/04; F16L 15/00; F16L 15/004
(Continued)

(56) References Cited

U.S. PATENT DOCUMENTS 4,153,283 A * 5/1979 Hellmund ............. F16L 15/004
285/334
4,707,001 A * 11/1987 Johnson ................ E21B 17/042
285/332.3
(Continued)

FOREIGN PATENT DOCUMENTS

CN       1292058 A     4/2001
CN     104060946 A     9/2014
(Continued)

OTHER PUBLICATIONS

First Office Action dated Jun. 27, 2018 for Chinese Patent Application No. 201580055764.3 (7 pages).
(Continued)

*Primary Examiner* — Aaron M Dunwoody
(74) *Attorney, Agent, or Firm* — Conley Rose, P.C.

(57) ABSTRACT

A threaded connection including first and second tubular components configured for exploration or operating a hydrocarbon well; the first tubular component including an external abutment, a male threaded connection portion extended by a non-threaded terminal portion defining an internal abutment at its axial end; the second tubular component including a female end defining at a free end a bearing surface forced against the external abutment, a female threaded connection portion made up with the male threaded connection portion and terminating in an internal shoulder forced against the internal abutment, an initial non-threaded portion connecting the female threaded connection portion to the internal shoulder, which includes a maximum radial interference locally forming a sealing surface located between the male threaded connection portion and the internal abutment, and located at a non-zero distance from the internal abutment, the distance being more than half of an axial distance of the terminal portion.

16 Claims, 4 Drawing Sheets

(58) Field of Classification Search
USPC .................................. 285/333, 334, 390
See application file for complete search history.

(56) References Cited

U.S. PATENT DOCUMENTS

| | | | | |
|---|---|---|---|---|
| 5,505,502 A * | 4/1996 | Smith | ............... | E21B 17/085 285/334 |
| 5,908,212 A | 6/1999 | Smith et al. | | |
| 6,010,163 A * | 1/2000 | Cerruti | ............... | E21B 17/042 285/333 |
| 6,056,324 A * | 5/2000 | Reimert | ............... | E21B 17/042 285/18 |
| 6,511,102 B2 | 1/2003 | Krug et al. | | |
| 7,475,476 B2 | 1/2009 | Roussie | | |
| 8,641,100 B2 * | 2/2014 | Patureau | ............... | F16L 15/004 285/333 |
| 2002/0017788 A1 * | 2/2002 | Krug | ............... | E21B 17/042 285/333 |
| 2002/0033603 A1 * | 3/2002 | Pallini, Jr. | ............... | E21B 17/042 285/333 |
| 2004/0262919 A1 * | 12/2004 | Dutilleul | ............... | E21B 17/042 285/333 |
| 2008/0265575 A1 * | 10/2008 | Charvet-Quemin | ............... | F16L 15/004 285/331 |
| 2010/0283239 A1 * | 11/2010 | Gillot | ............... | E21B 17/08 285/332.3 |
| 2011/0241339 A1 * | 10/2011 | Verger | ............... | E21B 17/042 285/332.2 |
| 2012/0098256 A1 | 4/2012 | Schulte et al. | | |
| 2012/0133129 A1 * | 5/2012 | Hignett | ............... | F16L 15/00 285/339 |
| 2012/0175846 A1 * | 7/2012 | Hedrick | ............... | E21B 17/042 277/314 |
| 2013/0033035 A1 * | 2/2013 | Gallagher | ............... | D05B 3/02 285/332.2 |
| 2013/0277963 A1 | 10/2013 | Carrois et al. | | |
| 2014/0265320 A1 * | 9/2014 | Pollack | ............... | E21B 17/042 285/334 |
| 2015/0145247 A1 * | 5/2015 | Zhu | ............... | E21B 17/042 285/333 |
| 2015/0167869 A1 * | 6/2015 | DeHart | ............... | F16L 15/004 285/334 |
| 2017/0292638 A1 * | 10/2017 | Sugino | ............... | E21B 17/03 |

FOREIGN PATENT DOCUMENTS

| | | |
|---|---|---|
| EP | 2212510 B1 | 1/2014 |
| FR | 2 969 738 A1 | 6/2012 |
| JP | 2002527696 A * | 8/2002 |
| JP | 2004502104 A | 1/2004 |
| JP | 2006-526747 A | 11/2006 |
| JP | 2013-87829 A | 5/2013 |
| WO | 2005/095840 A1 | 10/2005 |
| WO | 2006/092649 A1 | 9/2006 |
| WO | 2007/114460 A1 | 10/2007 |

OTHER PUBLICATIONS

International Search Report dated Dec. 22, 2015 in PCT/EP2015/073762 filed Oct. 14, 2015.

Ukrainian Decision to Grant for Ukrainian Patent Application No. 2017-03546, dated Apr. 2019 (10 pages).

Japanese Patent Application No. 2017-520345 Notice of Reasons for Refusal dated Sep. 24, 2019 (4 pages).

* cited by examiner

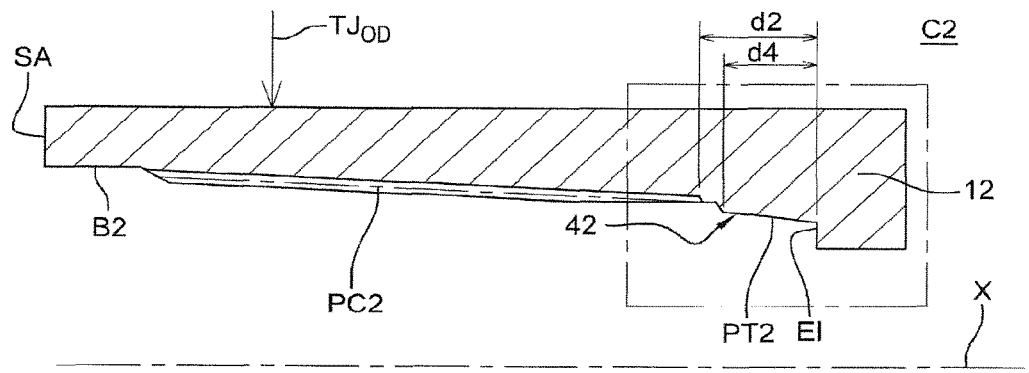
Fig. 3a
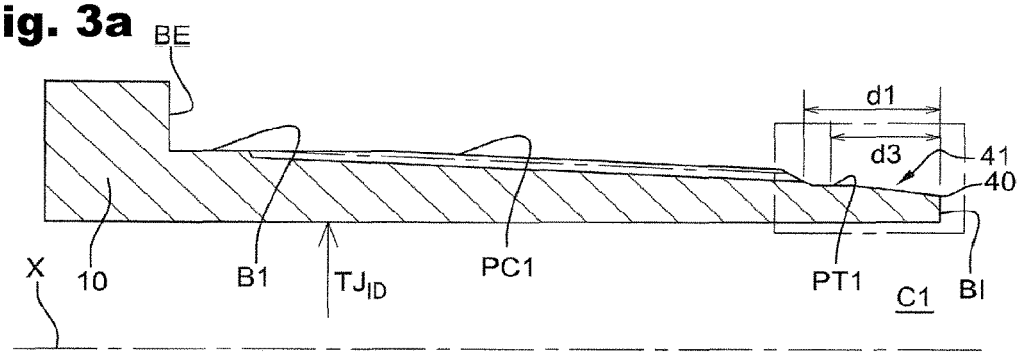
Fig. 3b
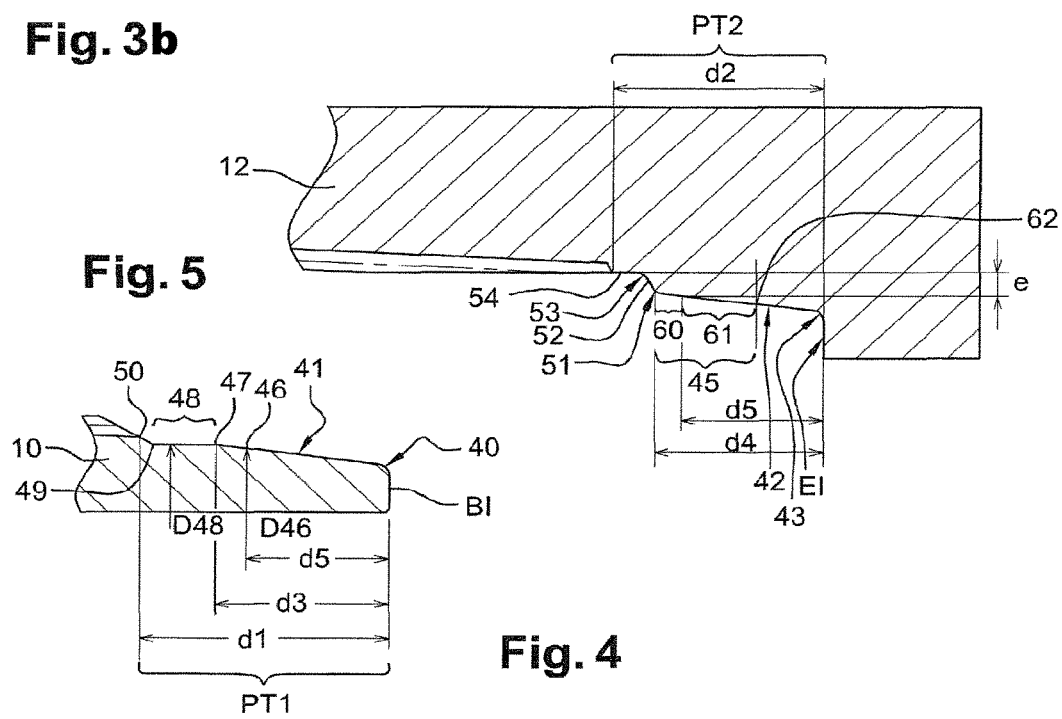
Fig. 5
Fig. 4

MULTIPURPOSE DOUBLE ABUTMENT SEALED CONNECTION

BRIEF SUMMARY OF THE DISCLOSURE

The invention relates to premium threaded tubular connections used in particular to connect steel tubes such as tubular components used in oil or gas fields. In particular, the invention is of application to components used for drilling and to components employed under high internal and external pressure conditions. These components have to withstand both tensile and compressive loads such as those encountered during operations for the hydraulic fracturing of rock, cementing a well, or when carrying out integrity tests on a well; these operations are even more critical when they are carried out at sea.

There is a need for connections which can be used both for drilling and for ensuring a seal.

The invention is also of application for strings used as sea, from platforms known as "offshore" platforms connecting the undersea well head to the drilling platform and which are subjected to large fatigue stresses as well as bending, tensile and torsional stresses due to the action of the waves, tides and marine currents. These strings used at sea, known as "drill pipe risers", can be used to convey the tools and instruments necessary for monitoring the operational parameters of the well which is ready for production (known in this case as a "work over riser") and for the first steps in production of a well (known in this case as an "early production riser").

These strings are frequently assembled and dismantled and need connections the integrity of which is maintained throughout their use.

There is a need for improvements to the seal of connections formed between these tubes because of the large variations on pressure which are possible between the interior and exterior of the column. There is also an economic need for connections allowing for multi-purpose usage of the tubes for various activities to be carried out on the production site, in particular both for drilling and for cementing.

In the prior art, it is conventional to use, for drilling steps, double abutment threaded connections with both internal and external abutments, namely upstream and downstream of the threaded portions. In particular, documents U.S. Pat. No. 5,908,212, WO-2005/095840 and WO-2006/092649 disclose various threaded connection solutions provided with double abutments of this type, and each representing trade-offs in the design of the threads of the threaded portion, the inclination of the threaded portion, the distribution of axial loads over the abutments, or the makeup torque required for connections of this type—these are all parameters which de facto define their implementation conditions.

Further, document U.S. Pat. No. 6,511,102 describes a connection dedicated to static strings used to connect a submarine well head to an offshore oil platform. This document U.S. Pat. No. 6,511,102 discloses a double abutment threaded connection provided with threads which can be used to increase its capacity under tension and having a double sealing surface. Although it is satisfactory for implementation in strings intended for ad hoc work in a well or to carry out production tests in it necessitating dropping in light equipment and accessories, this connection is not certified for operating conditions above 15000 psi of internal pressure and also not above 10000 psi of external pressure. In addition, a connection of this type has small abutting surface areas, which prevents its use for drilling operations.

Thus, there is a need for an improvement to double abutment connections that can be used to obtain high makeup torques, which is multi-purpose in use and, in addition to drilling, can be used for at least one other operation selected from well cementation, carrying out a well sealing and integrity tests or tests carried out from the well head in the first steps of production. Well cementation, along with carrying out sealing tests, exposes the string to a very high internal pressure. A cementation operation is intended to fix a casing dropped into the well in place, or to temporarily close off the entrance to a well with a view to future working or at the end of a working period for the well.

In particular, there is a need for a connection that can be used for drilling under unusual pressure conditions such as low pressure conditions within the string.

The invention aims to provide a solution to the problem posed by providing a threaded connection with a double abutment shoulder comprising a first tubular component made up onto a second tubular component, said tubular components being intended for exploration or operating a hydrocarbon well;

the first substantially cylindrical tubular component with an axis of revolution and comprising a male end, the male end comprising an external abutment, a male threaded connection portion extended by a non-threaded terminal portion defining an internal abutment at its axial end, a non-threaded male base being defined between the external abutment and the male threaded connection portion;

the second substantially cylindrical tubular component comprising a female end defining at a free end a bearing surface forced against the external abutment, this female end having on its internal surface a female threaded connection portion made up with the male threaded connection portion and terminating in an internal shoulder forced against the internal abutment, an initial non-threaded portion connecting the female threaded connection portion to the internal shoulder, a female non-threaded base being defined between the female threaded connection portion and the bearing surface, which comprises a maximum radial interference locally forming a sealing surface located between the male threaded connection portion and either the internal abutment or the external abutment, this maximum interference being located at a non-zero distance respectively from the internal abutment and the external abutment, this distance being at least more than 50% of the minimum between an axial distance of the terminal portion and an axial distance of the initial portion.

As an example, this maximum radial interference may be located between the male threaded connection portion and the internal abutment.

In particular, a continuous interference may be generated from the internal abutment to the maximum radial interference in order to prevent the formation of a volume which could risk trapping gases, which would generate an operational risk for the connection during operation.

More particularly, the maximum radial interference may be obtained by an interaction between an apex of a toroidal portion and a tapered portion, the toroidal portion being presented by one of the terminal portion or the initial portion, and the tapered portion being presented by the other of the terminal portion or the initial portion.

As an example, the toroidal portion may be presented by the initial portion, while the tapered portion is presented by a male inclined zone of the terminal portion.

In particular, a radius of curvature of the toroidal portion may be more than 50 mm, for example of the order of 300 mm.

In particular, an apex of the toroidal portion is located at an axial distance relative to the internal abutment, this axial distance possibly being in the range 60% to 90%, in particular in the range 70% to 80% of the axial distance of the initial portion relative to the internal shoulder.

Advantageously, an impact point of the apex of the toroidal portion on the male inclined zone may be located at an axial distance in the range 5 to 25 mm, preferably in the range 10 to 20 mm, in particular about 18 mm relative to the internal abutment.

As an example, the maximum radial interference is located at a radial distance from the start of the threaded connection portion, this radial distance being in the range 2 to 5 mm, for example.

In particular, these respective male and female threaded connection portions may have a threading inclination in the range 8.33 cm/m (1.0 inch/ft) to 10 cm/m (1.2 inch/ft) relative to the axis of the connection.

Finally, the invention also concerns a method for coupling a threaded connection in accordance with the invention, in which the connection is made up to a nominal makeup torque of more than 22250 N/m when the threaded connection of the invention has an external diameter of more than 13.02 cm (5⅛ inch) and an internal diameter of more than 7.18 cm (2⅞ inch).

In particular, the characteristics of this coupling method may be such that a nominal makeup torque may be more than 70000 N/m when the threaded connection of the invention has an external diameter of more than 20.32 cm (8 inch) and an internal diameter of more than 13 cm (5.119 inch).

The connection of the invention can be used to obtain nominal makeup torques which are higher than those of connections produced in accordance with API standards. The connection of the invention can be used to obtain at least 90% of the nominal makeup torques of prior art connections free of an annular sealing system obtained by radial metal-metal interference.

The invention will be better understood from the following description and from the accompanying figures. These are presented purely by way of indication and do not limit the invention in any way. In the figures:

BRIEF DESCRIPTION OF THE DRAWINGS

FIG. 3a is a detailed longitudinal sectional view of female elements of the threaded connection of the inset B of FIG. 2;

FIG. 3b is a detailed longitudinal sectional view of male elements of the threaded connection of the insert B of FIG. 2;

FIG. 4 is a detailed longitudinal sectional view of the inset C1 of FIG. 3b, representing a sealing portion in a non-threaded terminal portion of the male element of a threaded connection of the invention;

FIG. 5 is a detailed longitudinal sectional view of the inset C2 of FIG. 3a, representing a sealing portion in a non-threaded initial portion of the female element of a threaded connection in accordance with the invention;

FIG. 8c represents the connection in its final position after makeup.

DETAILED DESCRIPTION OF EXEMPLARY DISCLOSED EMBODIMENTS

Figure 1:
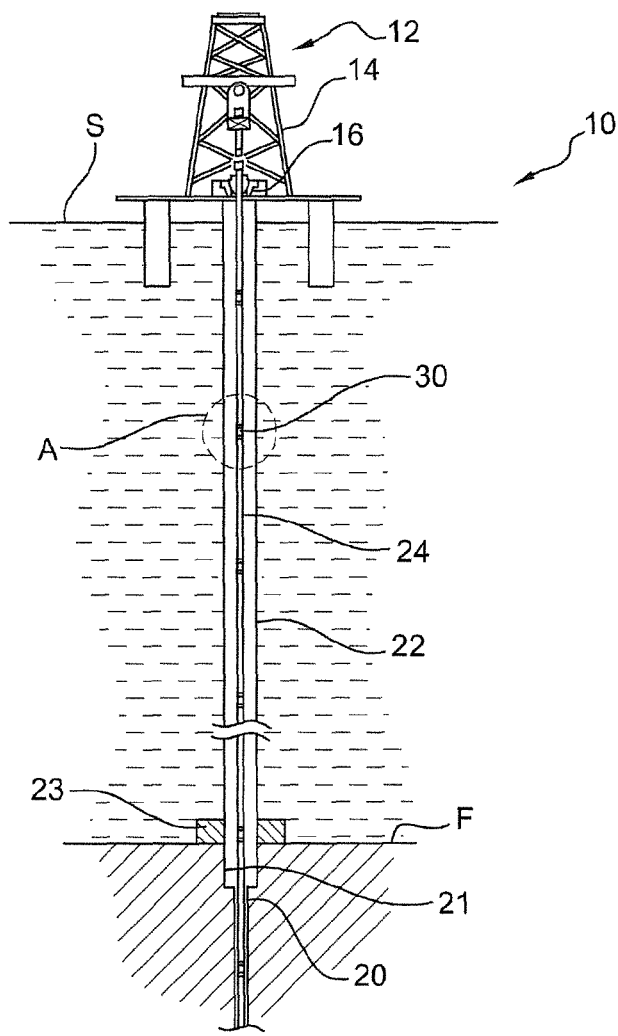
FIG. 1 represents an offshore oil platform illustrating the use of a string of tubular components in accordance with the invention.

FIG. 1 shows an offshore drilling facility 10 in which the present invention may be used to advantageous effect. In the example described, the facility 10 comprises an offshore platform 12 floating on the sea. The platform 12 comprises a rig 14 equipped with a rotary table 16 as well as a variety of accessories for grasping and manipulating the various elements used for the fabrication of the well and to operate it. The platform 12 is thus located directly over a submarine well 20 drilled into the sea floor F. The submarine well 20 is represented here as being cased, 21. The facility 10 comprises a string 22 (termed a marine riser) connecting the floating platform 12 and the well head 23 by forming a conduit which is exposed to marine currents and maintaining a protected internal space for the steps of well formation, in particular for drilling.

In the example illustrated in FIG. 1, a drill string 24 is disposed movably in the string 22. The drill string 24 comprises a plurality of tubular components connected end to end via their ends. The tubular components of the invention are produced from steel.

In accordance with the invention, the tubular components of the drill string shown are made up end to end using a threaded connection 30 in accordance with the invention. Makeup is carried out between a male threaded connection known as a "pin" and a female threaded connection known as a "box".

A threaded tubular connection, complying with optimized makeup specifications, guarantees optimized mechanical strength in the connection which is produced, for example as regards tensile loads but also as against accidental jump-out during service, and as regards optimized sealing performances.

Figure 2:
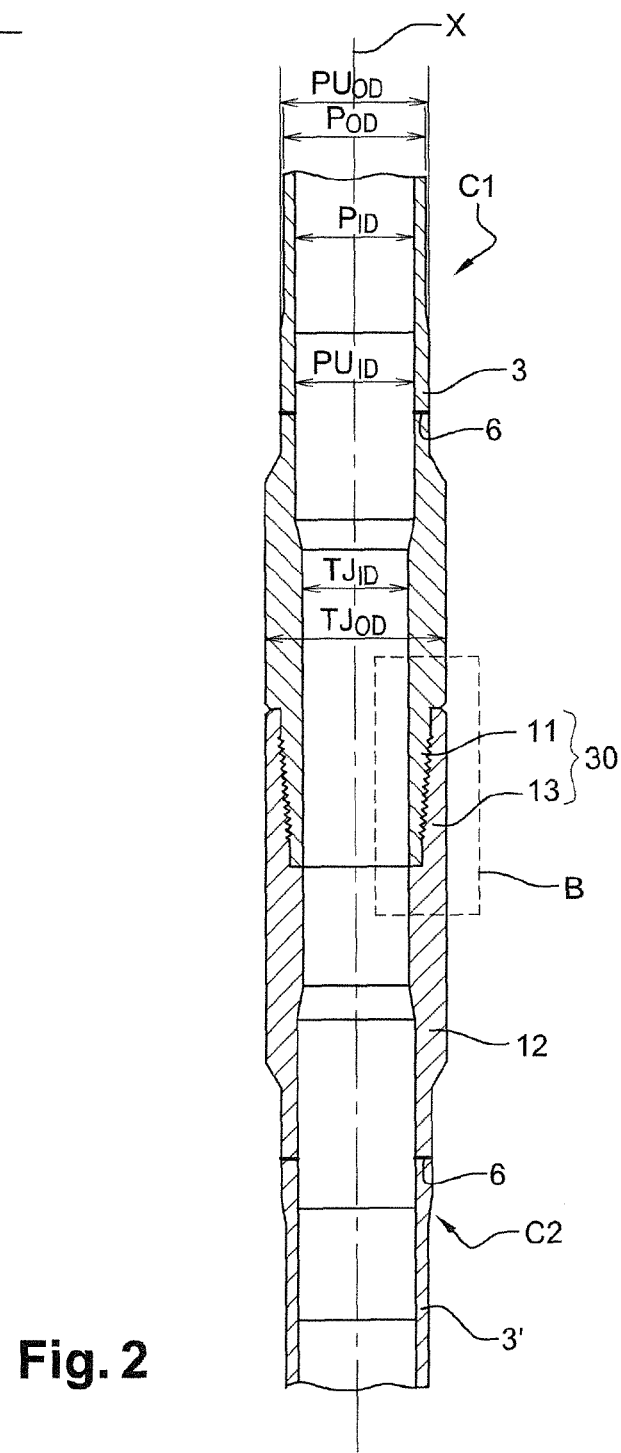
FIG. 2 is a detailed longitudinal sectional view of the inset A of FIG. 1, of a double abutment threaded connection in accordance with the invention.

In detail, FIG. 2, the threaded connection 30 of the invention comprises a first tubular component C1 and a second tubular component C2.

The first tubular component C1 comprises a first body 3 which is substantially cylindrical with an axis of revolution X. This first body 3 is welded annularly, for example by friction, to a second tubular body 10. In particular, the first body 3 may be defined by its external diameter $P_{OD}$ and its internal diameter $P_{ID}$. Locally near to the weld zone 6, the first body 3 has a wall thickness which is greater than that of the remainder of the body. This wall thickness may be obtained locally by a larger external diameter $PU_{OD}$, or a smaller internal diameter $PU_{ID}$. In particular, the external diameter $P_{OD}$ of the first body 3 is in the range 7.30 cm (2⅞ inch) to 22.86 cm (9 inch), preferably in the range 10.16 cm (4 inch) to 19.37 cm (7⅝ inch), including 14.92 cm (5⅞ inch).

In order to be able to be associated with the second tubular component C2, the second body 10 has a connection element 11 which is capable of cooperating with a complementary connection element 13 carried by the second tubular component C2. Engaging the connection elements 11 and 13 forms the threaded connection 30 of the invention. In the example represented in FIG. 2, the connection element 11 is a male element and the connection element 13 is a female element.

In particular, the second body 10, known as a tool joint, which is substantially cylindrical with an axis of revolution X, can be defined by its maximum external diameter $TJ_{OD}$ and its internal diameter $TJ_{ID}$. In particular, the maximum external diameter $TJ_{OD}$ of the second body 10 is in the range 12.06 cm (4¾ inch) to 22.22 cm (8¾ inch). The external diameter of the second body 10 is greater than the external diameter of the first body 3. In particular, the maximum internal diameter $TJ_{ID}$ of the second body 10 is in the range 6.19 cm (2⁷⁄₁₆ inch) to 14.29 cm (5⅝ inch), even up to 15.87 cm (6¼ inch).

The second body 10 may preferably be manufactured from steel with a grade of the order of 130 ksi, with a yield strength in the range 120000 to 140000 psi; but it may also be selected from higher grades of about 140 ksi, 150 ksi and 165 ksi, as well as from inferior steel grades such as those defined around 80 ksi or 95 ksi or indeed 110 ksi.

The second tubular component C2 comprises a first body 3' and a third body 12. The first body 3' is substantially of the same structure and the same dimension characteristics as the first body 3. This first body 3' is also welded annularly at 6 respectively with the third body 12. The third body 12 has the complementary connection element 13 mentioned above.

The connection 30 is produced such that the external and internal diameters of the second body 10 and the third body 12 have the same maximum external dimensions and the same internal diameter at least close to their connection zone represented by the inset B.

Advantageously, the third body 12 is produced from an identical grade of steel to that of the second body 10.

The profiles of the connection elements 11 and 13 are preferably obtained by machining. In particular, a chemical or mechanical surface treatment may be carried out on these machined portions. It may be a treatment by phosphatation using manganese or zinc, or indeed a sanding treatment. After the surface treatment, storage or makeup grease may be deposited on the connection elements 11 and 13.

The connection 30 has a double abutment both internally and externally.

The second body 10 has an external abutment BE at its external perimeter. This external abutment BE is in the form of a flat annular indentation. The flat of this indentation forms an acute or right angle with the axis X, in particular 90º in FIG. 3b.

The external abutment BE is linked via a base B1 to a male threaded connection portion PC1. The male base B1 is not threaded; it extends along the axis X and has an annular surface substantially parallel to the axis X at its external perimeter. The general shape of the connection portion PC1 is as an external truncated cone with a diameter that decreases with distance away from said base B1. The connection portion PC1 carries a threading on its external perimeter. The connection portion PC1 is extended by a non-threaded terminal portion PT1. The terminal portion PT1 is connected to a transverse surface forming an internal abutment BI at its free axial end.

This internal abutment BI is in the form of a flat annular surface. The flat of this surface forms an acute or right angle with the axis X, in particular 90º in FIG. 3b. The internal abutment BI connects to the internal perimeter defined by the body C1.

In the zone of the body C1 for which the external perimeter is defined by the external abutment BE, the male base B1, the connection portion PC1, and the terminal portion PT1, the internal diameter $TJ_{ID}$ is substantially constant.

In practice, when the connection is made between the two bodies C1 and C2, the respective axes of revolution of the bodies are substantially coincident.

The third body 12 extends along the axis X. It has a circular cross section with a maximum external diameter which is, for example, substantially equal to the maximum external diameter $TJ_{OD}$. The free axial end of the third body 12, orientated towards the first body 10 when the connection 30 of the invention is formed, defines a bearing surface SA.

The bearing surface SA is in the form of a flat annular surface. The flat of this surface forms an acute or right angle with the axis X, in particular 90º in FIG. 3a. The bearing surface SA connects to the external perimeter of the second body 12. It also connects to the internal perimeter of this hollow third body 12, in particular to a female base B2 of this internal perimeter. The female base B2 is not threaded; it defines an internal cylindrical perimeter with an axis parallel to the axis X.

The base B2 connects the bearing surface SA to the female threaded connection portion PC2. The connection portion PC2 has a generally tapered shape about is internal perimeter and has a threading which is capable of cooperating with the threading of the male connection portion PC1.

In order to optimize the dimensions of the contact surface defined between the bearing surface SA and the external abutment BE, the base B2 may be inclined while the base B1 remains cylindrical.

The female connection portion PC2 is internally extended by an initial portion PT2. This initial portion PT2 extends substantially along the axis X. This initial portion PT2 is connected to an internal shoulder EI defined transversely to the axis X. The internal shoulder EI has an inclination relative to the axis X which is substantially identical to that of the internal abutment BI. As can be seen in FIG. 3a, the internal shoulder EI defines a flat annular surface in a plane perpendicular to the axis X.

When the connection 30 is formed, the bearing surface SA is in contact with the external abutment BE over at least a portion of its surface and similarly, the internal abutment BI is in contact with the internal shoulder EI over at least a portion of its surface.

Figure 6:
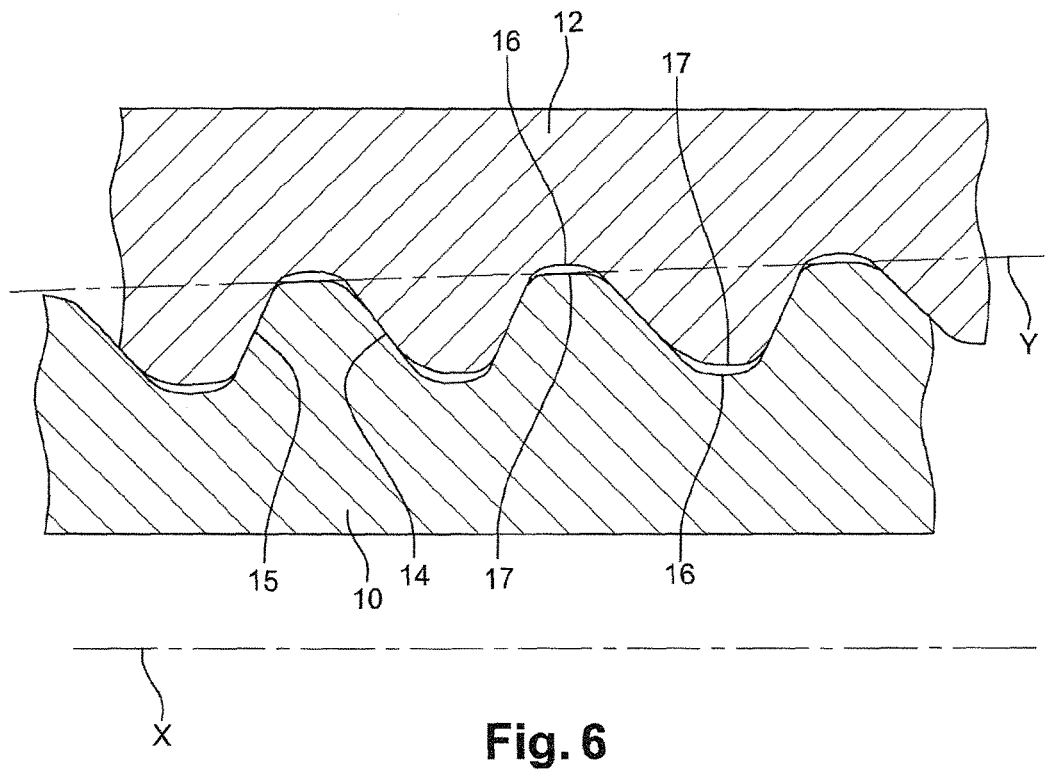
FIG. 6 is a longitudinal sectional view of the threaded connection portions in engagement of a threaded connection in accordance with the invention.

The connection portion of the threaded connection 30 formed by the interaction between the threads carried by the male threaded connection portion PC1 and the female threaded connection portion PC2 is represented in more detail in FIG. 6.

In particular, the inclination of the threading Y is in the range 8.33 cm/m (1.0 inch/ft) to 10 cm/m (1.2 inch/ft) relative to the axis of the connection X. Preferably, the threads may be in flank-flank interference. As an example, the threads of the male connection portion PC1 and respective female threaded portion PC2 may have a stabbing flank 14 in the range 35° to 42°, in particular about 40° relative to the axis of the threading Y, and a load flank 15 forming an angle in the range 25° to 34°, in particular about 30° with the axis of the threading Y. As an example, the base 16 of the threads may have the shape of a portion of an ellipse.

Advantageously, the crest 17 of the threads may have a slope in the direction opposite to that of the threading.

In particular, the connection portion may include a threading such as that described in patent U.S. Pat. No. 5,908,212. The threading may include tapered or trapezoidal threads. The connection portion may comprise imperfect thread zones upstream and downstream of the perfect thread zones and with an identical thread form.

The threaded connection 30 of the invention comprises a metal-metal seal produced between the terminal portion PT1 and the initial portion PT2, between the internal abutment obtained by pressurized engagement of the internal abutment BI against the internal shoulder EI, and the connection portion obtained by engagement of the male threaded connection portion PC1 with the female threaded connection portion PC2. This example will be described in more detail below.

However alternatively, in an embodiment which will not be provided in detail and which can be deduced by symmetry with the embodiment defined above, the metal-metal seal may be formed at the bases B1 and B2, namely between the external abutment BE and said connection portion.

This metal-metal seal is obtained by local formation of an annular interference zone, in particular by radial interference.

The terminal portion PT1 is connected to the internal abutment BI via a fillet portion 40. The fillet portion 40 is, for example, a rounded portion with a radius of curvature in the range 1 to 1.6 mm, preferably selected to be about 1.3 mm. Starting from the fillet portion 40, the external perimeter of the terminal portion PT1 has a zone 41 which is inclined with respect to the axis X. In particular, this inclination is greater than the inclination of the threading axis Y relative to the axis X. In particular, this male inclined zone 41 forms an angle in the range 5° to 15°, for example of the order of 7.1250 (taper ¼) with the axis X. The male inclined zone 41 is continuously inclined in this example, with the same inclination. The male inclined zone 41 defines a tapered portion.

The terminal portion PT1 extends along an axial distance d1 parallel to the axis X between the internal abutment BI and the threaded connection portion PC1. This distance d1 may be in the range 5 to 50 mm.

Preferably, an axial distance d3 along which the male inclined zone 41 extends with the same inclination is defined from the fillet angle 40. This distance d3 represents more than 50%, preferably more than 70% of the axial length d1.

The initial portion PT2 is connected to the internal shoulder EI via a fillet portion 43. The fillet portion 43 is, for example, a curved portion with a radius of curvature in the range 1 to 1.6 mm, preferably about 1.3 mm. Starting from the fillet portion 43, the initial portion PT2 comprises, in succession, a female zone 42 inclined with respect to the axis X and a toroidal portion 45.

The female inclined zone 42 defines a tapered surface. An inclination of this female inclined zone 42 is in particular greater than the inclination of the threading axis relative to the axis X. In particular, this female inclined zone 42 forms an angle in the range 5° to 15°, for example of the order of 7.125° (taper ¼), with the axis X. Preferably, the inclination of the female inclined zone 42 is selected so as to be substantially identical to that of the male inclined zone 41. For the same inclination, variations in the inclination along these inclined zones are tolerated as long as at any point, the tangent forms an angle with the axis of revolution of less than 80°, preferably less than 70°.

The initial portion PT2 extends along an axial distance d2 parallel to the axis X between the internal abutment EI and the threaded connection portion PC2. This distance d2 may be in the range 5 to 50 mm.

Preferably, the toroidal portion 45 has a broad radius of curvature. The toroidal portion 45 is bulged towards the interior of the tube and is intended to come into interference contact with the male inclined zone 41 in a manner so as to locally ensure a seal by radial interference.

The toroidal portion 45 has a radius of curvature in the range 50 mm to 800 mm, for example of the order of 300 mm, in order to distribute the interference pressure forces as far as possible and to avoid local plasticization of the male inclined zone 41.

The apex 46 of the toroidal portion 45 defines the position of the maximum radial interference which is desired between the inclined zone 41 of the terminal portion (PT1) and the initial portion (PT2) when the connection 30 of the invention is produced. This apex 46 is defined at a distance d5 parallel to the axis X of the internal shoulder EI.

The apex 46 of the toroidal portion 45 is defined at an axial distance d5 which is substantially identical to the axial distance of the point of impact of this apex of the toroidal portion 45 on the male inclined zone 41 relative to the internal abutment BI.

This distance d5 defines the position of the maximum radial interference obtained between the connection elements 11 and 13 relative to the internal abutment. This distance d5 is, for example, in the range 5 to 25 mm, preferably in the range 10 to 20 mm, for example of the order of 18 mm. This distance d5 is greater than the minimum defined by half the distance d1 and half the distance d2.

d5>min (50% of d1; 50% of d2)

Preferably, d5>min (70% of d1; 70% of d2)

In all cases, d5 is less than d3 and less than d2.

The axial distance d5 is, for example, in the range 60% to 90% of the axial distance d2 of the initial portion PT2 relative to the internal shoulder, in particular in the range 70% to 80% of this distance d2.

The axial distance d5 is, for example, in the range 60% to 90% of the axial distance d1 of the terminal portion PT1 relative to the internal abutment, in particular in the range 70% to 80% of this distance d1.

Thus, the maximum interference surface 46 is disposed at a distance from the internal abutment BI in order to prevent the internal abutment from collapsing and randomness in the formation of the seal. This separation also means that a guide function along the internal abutment is provided without risking damage to the sealing zone during coupling of the male element into the female element until the connection 30 is formed. Another advantage to this position back from the maximum sealing surface 46 is to limit galling during coupling and to limit stress peaks at the end of makeup.

Figure 7:
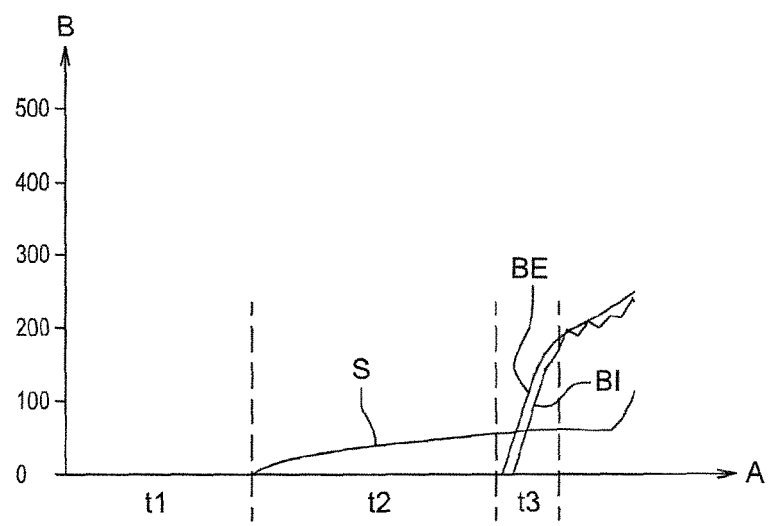
FIG. 7 represents the change in the elastic deformation of the abutments and of the maximum metal-metal radial interference zone during makeup of a connection in accordance with the invention.

FIG. 7 represents the change, determined by finite element method calculations, of the deformation measured as a % of the elastic deformation along the axis B during makeup of the connection 30 along the axis A of the graph.

Figure 8A:
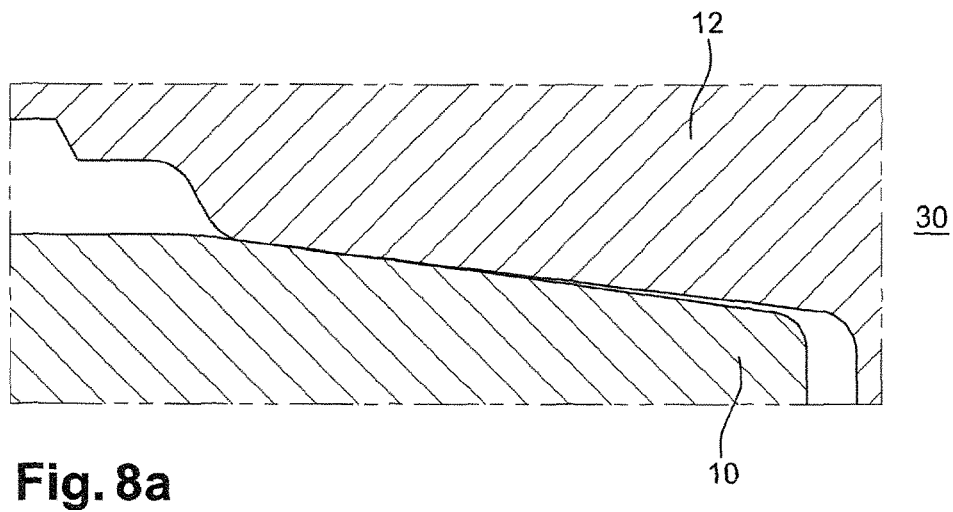
FIGS. 8a, 8b and 8c represent detailed sectional views of portions located between the threaded connection portion and the internal abutment as they become engaged during makeup of a threaded connection of the invention.
Figure 8B:
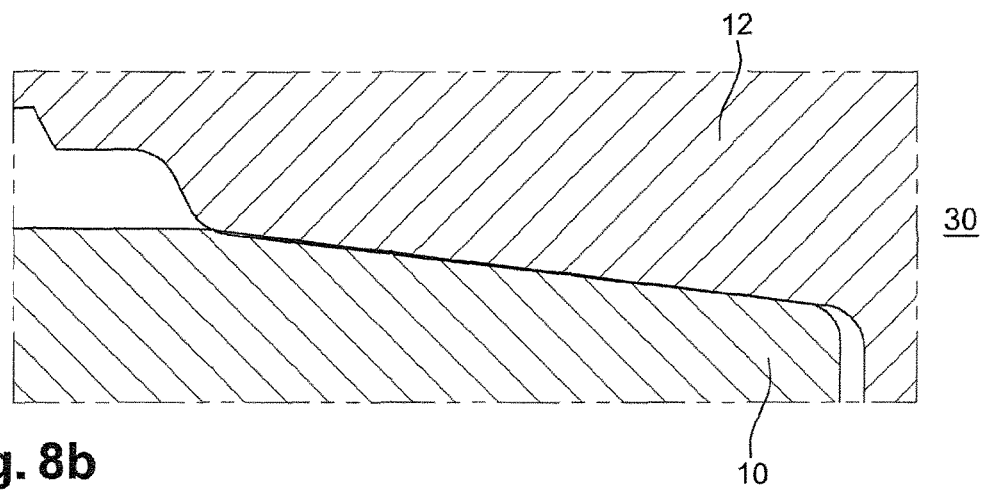

At the start of makeup, for a certain number of turns extending over a period t1, neither the internal abutment BI nor the external abutment BE nor the radial interference maximum provided in the connection is deformed. Next, progress of the makeup during a period t2 gradually forms the radial interference between the apex 46 of the toroidal portion 45 and the male inclined zone 41. FIG. 8a represents the connection being formed at the start of the period t2. It will be seen that for a connection 30, there is a very slow and gradual rise in the deformation at this interference zone during this period t2. FIG. 8b represents a connection towards the end of the period t2.

Figure 8C:
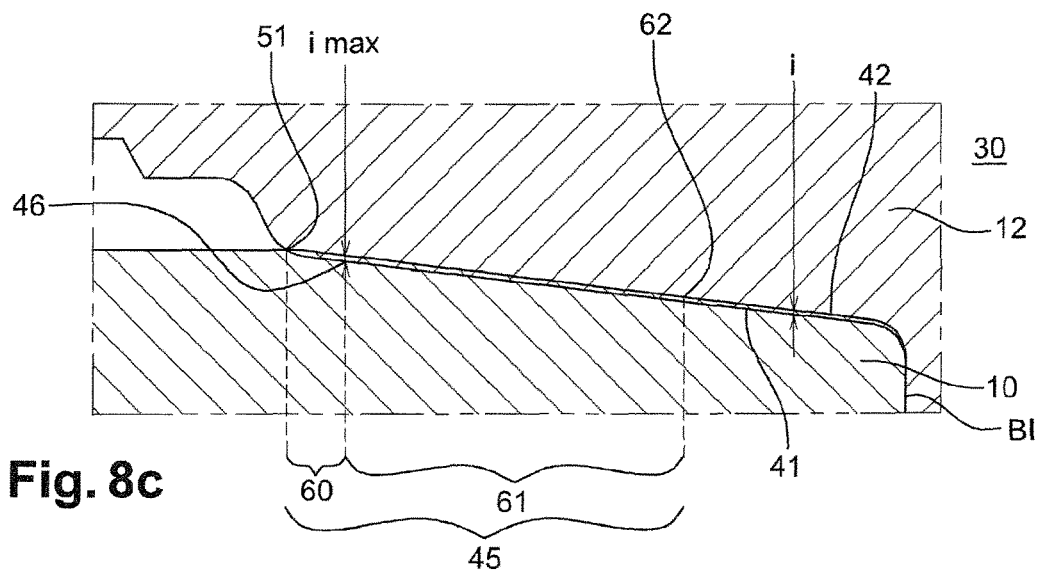

Finally, in the last part of makeup, period t3 is intended to bring the abutments into contact; first the external abutment and then the internal abutment are brought into contact. The period t3 is terminated by reaching a predefined makeup torque for the connection 30. The particular configuration of the terminal portion PT1 and the initial portion PT2 means that the maximum interference zone 46 can be maintained at a degree of deformation which is always less than 100%/of its yield strength. FIG. 8c represents the connection at the end of period t3.

This particular configuration means that galling can be avoided during the formation of the connection 30.

The connection 30 of the invention has the advantage of passing the test of being consecutively made up and broken out 100 times while guaranteeing a seal under conditions of internal pressure of 20000 psi and 15000 psi of external pressure throughout its period of use.

In practice, the seal was validated in accordance with the ISO standard ISO-13628. A gas-tight seal was also demonstrated for an internal pressure of 30000 psi in the context of a connection with a diameter $TJ_{OD}$ of 13.02 cm (5⅛ inch).

Using finite element method modelling tests, the connection 30 of the invention also qualified as a seal for pressure loads beyond 200 MPa, for example beyond 400 MPa or even 600 MPa.

In practice, in accordance with the invention, a connection 30 in accordance with the invention fulfils the criteria imposed by the two conditions defined below:

ratio=radius of the toroidal portion 45 (in mm)/maximum radial interference measured at diameter (in mm). (1)

The maximum radial interference measured at diameter corresponds to twice the value $i_{max}$ represented in FIG. 8c, $i_m$ representing the maximum radial interference measured at radius.

ratio>−0.261×[grade of steel of second body 10 in MPa]+400 (2)

As an example, when the second body 10 is produced from 130 ksi grade steel, i.e. 896 MPa, then the dimensions are, for example, selected so as to have a radius of curvature of the toroidal portion 45 of 300 mm, and a maximum radial interference at diameter of 0.41 mm.

Advantageously, when the connection 30 is formed, the maximum radial interference 46 is located at a radial distance e relative to the start of the threaded portion so as not to affect the loads already exerted in the threaded portion. This radial distance e is, for example, in the range 2 to 5 mm, for example of the order of 3.12 mm.

Advantageously as can be seen in FIGS. 8b and 8c, the inclined male 41 and respectively female 42 zones are provided so that they are also in radial interference. In particular, the interference i between these inclined zones 41 and 42 is of a value which is smaller than the maximum radial interference $i_{max}$. As an example, because the inclinations are the same, the interference i which is constant over the whole of the portion of the zones 41 and 42 in interference contact is less than ⅔ of $i_{max}$, for example, or even less than half of $i_{max}$. Thus, the interference zone extends over the whole of the axial distance d5. Preferably, when the connection 30 is formed, the interference obtained between the second body 10 and the third body 12 extends continuously from the fillet portion 43 to the position of this maximum interference 46, or even a little beyond it in the direction of the connection portion.

On the terminal portion PT1, the male inclined zone 41 is connected, via a fillet radius 47, to a cylindrical portion 48 with a diameter which is strictly less than the diameter observed in the thread root of the male threaded connection portion PC1 immediately adjacent to the terminal portion PT1. Alternatively, the fillet 47 may be a sharp angle and not rounded. The cylindrical portion 48 is connected via a fillet radius 49 to an inclined fillet portion 50 which provides the liaison with the male threaded connection portion PC1.

The gauge diameter $D_{46}$ at the apex 46 is less than the gauge diameter $D_{48}$ of the cylindrical portion 48. In particular, the difference between these two gauge diameters $D_{46}$ and $D_{48}$ is in the range 0.5 to 1 mm, for example of the order of 0.81 mm.

On the initial portion PT2, the toroidal portion 45 is connected via a convex fillet radius 51 to an inclined fillet portion 52. The inclined fillet portion 52 is connected via a fillet radius 53 to a cylindrical portion 54 which provides the link with the female threaded connection portion PC2.

An axial distance d4 defines the axial distance along the axis X of the sum of the distances along this axis X of the female inclined zone 42 and of the toroidal portion 45. This distance d4 represents more than 50%, more preferably more than 70% of the axial length d2. In practice, d4 is greater than d5, as the toroidal portion 45 extends either side of its apex 46. In particular, the toroidal portion is designed such that its apex 46 is not centred on the middle of said toroidal portion 45. The toroidal portion 45 comprises a portion 61 between the apex 46 and a fillet 62 to the female inclined zone 42 which extends over an axial distance which is greater than the axial distance of a second portion 60, this second portion 60 being defined between the apex 46 and the convex fillet radius 51. The fillet 62 is, for example, designed to connect tangentially both to the toroidal portion 45 and to the female inclined zone 42.

Throughout the description, the expression "comprising a" should be considered to be synonymous with "comprising at least one", unless specified otherwise.

The invention claimed is:
1. A threaded connection comprising:
a double abutment shoulder comprising a first tubular component made up onto a second tubular component, the tubular components being configured for exploration or operating a hydrocarbon well;
the first substantially cylindrical tubular component with an axis of revolution and comprising a male end, the male end comprising an external abutment, a male threaded connection portion extended by a non-threaded terminal portion defining an internal abutment at an axial end, a non-threaded male base being defined between the external abutment and the male threaded connection portion;
the second substantially cylindrical tubular component comprising a female end defining at a free end a bearing surface forced against the external abutment, the female end including a female threaded connection portion on an internal surface, made up with the male threaded connection portion and terminating in an internal shoulder forced against the internal abutment, an initial non-threaded portion connecting the female threaded connection portion to the internal shoulder, a female non-threaded base being defined between the female threaded connection portion and the bearing surface;

and further comprising a maximum radial interference locally forming a sealing surface located between the male threaded connection portion and one of the internal abutment and the external abutment, the maximum interference being located at a non-zero distance respectively from the internal abutment and the external abutment, the distance being at least more than 50% of the minimum between an axial distance of the terminal portion and an axial distance of the initial portion.

2. The connection according to claim 1, wherein the maximum radial interference is located between the male threaded connection portion and the internal abutment.

3. The connection according to claim 1, wherein a continuous interference is generated from the internal abutment to the maximum radial interference.

4. The connection according to claim 1, wherein the maximum radial interference is obtained by an interaction between an apex of a toroidal portion and a tapered portion, the toroidal portion being presented by one of the terminal portion or the initial portion, and the tapered portion being presented by the other of the terminal portion or the initial portion.

5. The connection according to claim 4, wherein the toroidal portion is presented by the initial portion and the tapered portion is presented by a male inclined zone of the terminal portion.

6. The connection according to claim 4, wherein a radius of curvature of the toroidal portion is more than 50 mm.

7. The connection according to claim 4, wherein an apex of the toroidal portion is located at an axial distance relative to the internal abutment in the range 60% to 90% of the axial distance of the initial portion relative to the internal shoulder.

8. The connection according to claim 4, wherein an apex of the toroidal portion is located at an axial distance relative to the internal abutment in the range 70% to 80% of the axial distance of the initial portion relative to the internal shoulder.

9. The connection according to claim 4, wherein an impact point of the apex of the toroidal portion on the male inclined zone is located at an axial distance in the range 5 to 25 mm relative to the internal abutment.

10. The connection according to claim 4, wherein an impact point of the apex of the toroidal portion on the male inclined zone is located at an axial distance in the range 10 to 20 mm relative to the internal abutment.

11. The connection according to claim 4, wherein an impact point of the apex of the toroidal portion on the male inclined zone is located at an axial distance of about 18 mm relative to the internal abutment.

12. The connection according to claim 4, wherein the maximum radial interference is located at a radial distance from the start of the threaded connection portion, the radial distance being in a range of 2 to 5 mm.

13. A method for coupling a threaded connection according to claim 4, wherein the connection is made up to nominal makeup torque of more than 70000 N/m when the threaded connection has an external diameter of more than 20.32 cm (8 inch) and an internal diameter of more than 13 cm (5.119 inch).

14. The connection according to claim 1, wherein the maximum radial interference is obtained by an interaction between an apex of a toroidal portion and a tapered portion, the toroidal portion being presented by one of the terminal portion or the initial portion, and the tapered portion being presented by the other of the terminal portion or the initial portion.

15. The connection according to claim 1, wherein the respective male and female threaded connection portions have a threading inclination in the range 8.33 cm/m (1.0 inch/ft) to 10 cm/m (1.2 inch/fit) relative to the axis of the connection.

16. A method for coupling a threaded connection according to claim 1, wherein the connection is made up to a nominal makeup torque of more than 22250 N/m when the threaded connection has an external diameter of more than 13.02 cm (5⅛ inch) and an internal diameter of more than 7.18 cm (2⅞ inch).

* * * * *